2,897,196

1α,5α-EPIDITHIOPREGNANE-3,20-DIONE AND DERIVATIVES THEREOF

Robert C. Tweit, Wilmette, Ill., assignor to G. D. Searle & Co., Chicago, Ill., a corporation of Delaware No Drawing. Application March 27, 1958
Serial No. 724,278

6 Claims. (Cl. 260—239.5)

The present invention relates to 1,5-dithiopregnane derivatives which can be represented by the general structural formula

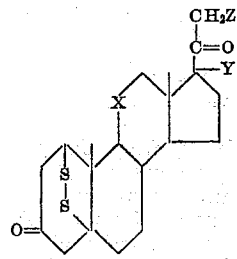

in which X can represent a methylene radical, hydroxymethylene radical or carbonyl radical, Y can represent hydrogen or a hydroxyl radical and Z can represent hydrogen, a hydroxy radical or a lower alkanoyloxy radical. Among the lower alkanoyl radicals comprehended herein are formyl, acetyl, propionyl, butyryl, valeryl, hexanoyl, heptanoyl, octanoyl and branched-chain isomers thereof, said alkanoyl radicals being the acyl radicals of alkanoic acids containing fewer than 9 carbon atoms.

Compositions of the present invention can be prepared by treating a solution of 1,4-pregnadiene-3,20-dione or a derivative thereof with hydrogen sulfide and a basic catalyst. The reaction is improved by alternately passing air and hydrogen sulfide through the reaction mixture or by adding sulfur. Suitable solvents for the reaction include pyridine, dioxane and lower alkanols such as methanol, ethanol and the like.

Suitable catalysts include amines such as trimethylamine, piperidine, piperazine, morpholine and the like.

The temperature at which the reaction proceeds is not critical. A convenient temperature is at or about room temperature but a lower temperature or elevated temperature and pressure can be used if desired.

The 1,4-pregnadiene-3,20-diones used as starting materials can be substituted at the 11-position by carbonyl or they may be substituted at any one or all of the 11,17- and 21-positions by hydroxy and lower alkanoyl esters thereof. When the compound desired is one having esterified hydroxyl groups, it is suitable to employ as starting material the corresponding esters or alternatively to carry out the addition reaction on the derivative having the free hydroxyl groups and subsequently to esterify using esterification procedures known in the art such as pyridine and a lower alkanoic acid anhydride.

The addition of hydrogen sulfide to the 1,4-pregnadiene derivatives comprehended herein as starting materials proceeds under steric influences such that of the possible stereoisomers formed, one is obtained in predominant amount. The isomer obtained in predominant amount has in each case been characterized herein as possessing the α-configuration. This configuration has been designated in order to provide a more complete exposition of the present invention, and in order that the specification shall constitute a more useful contribution to the art. The designated configuration is based upon analogy with similar reactions of addition to the $\Delta^1$-3-keto system. It will be apparent that no part of this specification will be materially defective if it should later be established that the configuration is the opposite of that deducible from data presently available to workers in the field.

The compounds of the present invention have useful pharmacological properties as hormonal agents of the luteoid and adrenocorticoid types, more specifically as progestational agents, and as neoglycogenetic and anti-inflammatory agents of the cortisone type.

This invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are expressed in degrees centigrade and quantities of materials are expressed in parts by weight and parts by volume which bear the same relation one to another as kilograms to liters.

Example 1

A solution of 2 parts by weight of 1,4-pregnadiene-3,20-dione in 60 parts by volume of pyridine is saturated with hydrogen sulfide. After air is passed into the solution for one minute, two drops of piperidine are added and the mixture allowed to stand for 5 days. It is then diluted with 200 parts by volume of water and extracted three times with 100 parts by volume portions of ether. The ether extracts are combined and washed five times with water. The white solid which forms in the ether layer is collected and crystallized twice from acetone-ether to yield 1α,5α-epidithiopregnane-3,20-dione; melting point 221–222° (dec.); $[\alpha]_D = -4.05°$.

Example 2

A solution of 2 parts by weight of 21-acetoxy-1,4-pregnadiene-3,20-dione in 60 parts by volume of pyridine is saturated with hydrogen sulfide. Four drops of piperidine are added and after two days standing, air is bubbled through the solution for one-half hour followed by hydrogen sulfide for one-half hour. After an additional 8 days standing the solution is diluted with 200 parts by volume of water. The solid which forms is collected and crystallized twice from acetone to yield 21-acetoxy-1α,5α-epidithiopregnane-3,20-dione; melting point 188–190° (dec.); $[\alpha]_D = +4.3°$.

Example 3

A solution of 2 parts by weight of 21-acetoxy-17α-hydroxy-1,4-pregnadiene-3,20-dione in 60 parts by volume of pyridine is saturated with hydrogen sulfide. Air is bubbled into the solution for one-half hour, hydrogen sulfide for one hour and the solution allowed to stand overnight. Hydrogen sulfide is passed into the solution for 2 hours, four drops of piperidine are added and the mixture allowed to stand for 6 days. The reaction mixture is diluted with 200 parts by volume of water and extracted four times with 100 parts by volume portions of ether. The ether extracts are combined and washed four times with water. The solid which forms in the ether layer is collected and crystallized from acetone to yield 21-acetoxy-1α,5α-epidithio-17α-hydroxy-pregnane-3,20-dione; melting point 222–223° (dec.); $[\alpha]_D = -15.7°$.

Example 4

A solution of 3.24 parts by weight of 21-acetoxy-17α-hydroxy-1,4-pregnadiene-3,11,20-trione in 100 parts by volume of pyridine is saturated with hydrogen sulfide, Air is bubbled into the solution for one-half hour, hydrogen sulfide for one-half hour and finally, air for one-quarter hour. Three drops of piperidine are added and the solution is allowed to stand for 72 hours. The reaction mixture is poured into 500 parts by volume of water and the solid which forms is collected and crystallized from methylene chloride-acetone-methanol and then from methylene chloride-methanol to yield 21-acetoxy - 1α,5α - epidithio - 17α - hydroxypregnane-3,11,20-trione; melting point 235–237° (dec.); $[\alpha]_D = -3.96°$.

*Example 5*

A solution of 2 parts by weight of 21-acetoxy-11β,17α-dihydroxy-1,4-pregnadiene-3,20-dione in 60 parts by volume of pyridine is saturated with hydrogen sulfide. Air and hydrogen sulfide alternately are bubbled into the solution twice and then the solution is allowed to stand overnight. The solution is again saturated with hydrogen sulfide and allowed to stand for three more days. It is then concentrated to dryness and the residue dissolved in 15% ethyl acetate in benzene and chromatographed on silica gel. The chromatographic column is eluted with 4000 parts by volume of 20% ethyl acetate in benzene, the solvent removed from the eluate and the residue recrystallized from acetone-ether to yield 21-acetoxy - 11β,17α - dihydroxy - 1α,5α - epidithiopregnane-3,20-dione containing one mole of acetone of crystallization; melting point 222–224° (dec.); $[\alpha]_D = +1.42°$.

*Example 6*

A solution of 5 parts by weight of 17α,21-dihydroxy-1,4-pregnadiene-3,11,20-trione, 50 parts by volume of pyridine and 40 parts by volume of propionic anhydride is allowed to stand at about 25° for about 24 hours during which time a crystalline product separates. The mixture is chilled and filtered, and the crystalline product is washed with ether. This compound is 17α-hydroxy-21 - propionoxy - 1,4 - pregnadiene - 3,11,20 - trione which melts at about 238–242° and is suitable for use without further purification.

Hydrogen sulfide is bubbled into a mixture of 20.7 parts by weight of 17α-hydroxy-21-propionoxy-1,4-pregnadiene-3,11,20-trione, 1.6 parts by weight of sulfur and 375 parts by volume of pyridine until the sulfur is dissolved. Then one-half part by volume of piperidine is added and the solution allowed to stand overnight. The reaction mixture is concentrated under vacuum, toluene added and the toluene distilled to remove the last of the pyridine. The residue is taken up in benzene and chromatographed on silica gel. The chromatographic column is eluted with 10,000 parts by volume of 20% ethyl acetate in benzene, the solvent removed from the eluate and the solid residue recovered and crystallized from methanol to yield 1α,5α-epidithio-17α-hydroxy-21-propionoxypregnane-3,11,20-trione which has absorption bands in the infrared spectrum at 5.8, 8.2 and 8.4 microns.

What is claimed is:
1. A compound having the formula

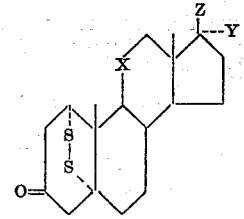

wherein X is selected from the group consisting of methylene, hydroxymethylene and carbonyl, Y is selected from the group consisting of hydroxy and hydrogen and Z is selected from the group consisting of acetyl, hydroxyacetyl and lower alkanoyloxyacetyl.

2. 1α,5α-epidithiopregnane-3,20-dione.
3. 21-acetoxy-1α,5α-epidithiopregnane-3,20-dione.
4. 21 - acetoxy - 1α,5α - epidithio - 17α - hydroxypregnane-3,20-dione.
5. 21 - acetoxy - 1α,5α - epidithio - 17α - hydroxypregnane-3,11,20-trione.
6. 21 - acetoxy - 11β,17α - dihydroxy-1α,5α - epidithiopregnane-3,20-dione.

No references cited.